(12) United States Patent
Won

(10) Patent No.: US 12,425,557 B2
(45) Date of Patent: Sep. 23, 2025

(54) IMAGE DISPLAY SYSTEM INCLUDING DISPLAY PANEL AND LENS ARRAY, AND METHOD OF OPERATING THE IMAGE DISPLAY SYSTEM

(71) Applicant: SAMSUNG DISPLAY CO., LTD., Yongin-si (KR)

(72) Inventor: Byeong Hee Won, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 69 days.

(21) Appl. No.: 18/423,432

(22) Filed: Jan. 26, 2024

(65) Prior Publication Data
US 2024/0305761 A1  Sep. 12, 2024

(30) Foreign Application Priority Data
Mar. 6, 2023 (KR) ......................... 10-2023-0029279

(51) Int. Cl.
*H04N 13/122* (2018.01)
*G09G 3/00* (2006.01)
*H04N 13/167* (2018.01)
*H04N 13/305* (2018.01)

(52) U.S. Cl.
CPC ........... *H04N 13/122* (2018.05); *G09G 3/001* (2013.01); *H04N 13/167* (2018.05); *H04N 13/305* (2018.05)

(58) Field of Classification Search
CPC .. H04N 13/122; H04N 13/167; H04N 13/305; G09G 3/001; G09G 3/3208; G09G 3/36; G09G 2340/00; G02B 30/27; G02B 30/29
USPC .............................................. 348/51
See application file for complete search history.

(56) References Cited

U.S. PATENT DOCUMENTS

| 11,250,770 B1* | 2/2022 | Wu ...................... G09G 3/3208 |
| 11,289,050 B2 | 3/2022 | Bae et al. |
| 11,468,829 B2 | 10/2022 | Kim et al. |
| 2003/0118248 A1* | 6/2003 | Kyong ...................... G06T 5/10 382/277 |
| 2007/0035557 A1* | 2/2007 | Choe ........................ G09G 5/02 345/613 |
| 2010/0322536 A1* | 12/2010 | Tezuka ............... H04N 1/40068 382/300 |

(Continued)

FOREIGN PATENT DOCUMENTS

| JP | 5820716 | 10/2015 |
| KR | 10-2021-0020791 | 2/2021 |
| KR | 10-2022-0037227 | 3/2022 |

*Primary Examiner* — Tung T Vo
(74) *Attorney, Agent, or Firm* — F. CHAU & ASSOCIATES, LLC

(57) ABSTRACT

An image display system includes a display device including a plurality of pixels arranged in a first direction and a second direction crossing the first direction, and a lens array disposed on an upper surface of the display device and is configured to refract an image from the display device. The display device is configured to receive image data including an object, correct at least a portion of pixel data units of the image data, and display the image according to the corrected pixel data units. Each of the corrected pixel data units is corrected by reflecting pixel values of first pixel data units of the image data adjacent from a corresponding pixel data unit in the first direction when displayed as the image.

17 Claims, 16 Drawing Sheets

(56) References Cited

U.S. PATENT DOCUMENTS

| | | | |
|---|---|---|---|
| 2013/0242194 A1* | 9/2013 | Kitagawa | G09G 3/3648 |
| | | | 348/571 |
| 2014/0321767 A1 | 10/2014 | Seto et al. | |
| 2014/0347453 A1* | 11/2014 | Tanaka | G09G 3/36 |
| | | | 348/54 |
| 2015/0043786 A1* | 2/2015 | Ohki | G06T 5/70 |
| | | | 382/107 |
| 2016/0086526 A1* | 3/2016 | Kim | G09G 3/007 |
| | | | 345/698 |
| 2016/0203751 A1* | 7/2016 | Suginohara | G09G 3/2003 |
| | | | 345/694 |
| 2016/0379541 A1* | 12/2016 | Ahn | G09G 3/3611 |
| | | | 345/589 |
| 2017/0294168 A1* | 10/2017 | Iijima | G09G 3/3611 |
| 2018/0210327 A1* | 7/2018 | Miyagi | H04N 9/3188 |
| 2019/0385534 A1* | 12/2019 | Park | G09G 3/3275 |
| 2021/0049945 A1* | 2/2021 | Bae | G09G 3/20 |

* cited by examiner

FIG. 6
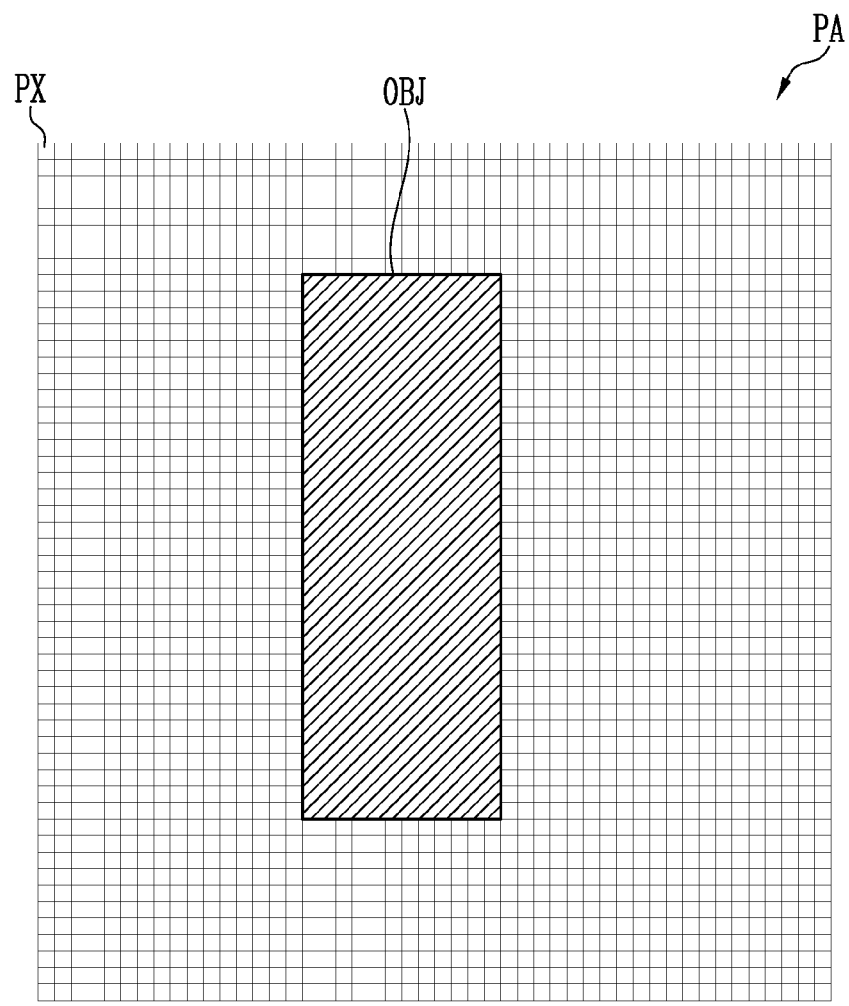
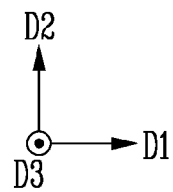

IMAGE DISPLAY SYSTEM INCLUDING DISPLAY PANEL AND LENS ARRAY, AND METHOD OF OPERATING THE IMAGE DISPLAY SYSTEM

This application claims priority to Korean Patent Application No. 10-2023-0029279, filed on Mar. 6, 2023, and all the benefits accruing therefrom under 35 U.S.C. § 119, the content of which in its entirety is herein incorporated by reference.

BACKGROUND

1. Field

The disclosure relates to an electronic device, and more particularly, to an image display system including a display panel and a lens array, and a method of operating the image display system.

2. Description of the Related Art

A display device is a connection medium between a user and information being presented to the user. Accordingly, use of a display device such as a liquid crystal display device (LCD) and an organic light emitting display device (OLED) is increasing.

A stereoscopic image display device allows a viewer to perceive a displayed image as a stereoscopic image. Such a stereoscopic image can provide a visual sense of a real object to the viewer. The stereoscopic image display device may output a left eye image and a right eye image to allow the viewer to see a three-dimensional image by binocular parallax between a left eye and a right eye.

Recently, research on a display device that provides the three-dimensional image to a viewer without wearing special glasses has been actively conducted.

The material described above is only intended to help with the understanding of the background of the disclosure.

SUMMARY

An image display system may include a lens array disposed on an upper surface of a display device and configured to refract an image from the display device, and lenses of the lens array may be relatively slanted with respect to an arrangement direction of pixels of the display device, where an axis of the lenses can form an acute angle to the axis of the pixels. The applicant has found that a slanted angle of the lenses may distort an image output through the lenses.

An image display system according to embodiments of the disclosure may output a three-dimensional image of improved clarity and reliability. For example, the image display system allows a user viewing the image to perceive that distortion that may appear in the image due to a slanted angle of lenses is reduced or that corresponding distortion does not exist.

According to an embodiment of the disclosure, an image display system includes a display device including a plurality of pixels arranged in a first direction and a second direction crossing the first direction, and a lens array disposed on an upper surface of the display device, wherein the lens array is configured to refract an image from the display device. The display device is configured to receive image data including an object, correct at least a portion of pixel data units of the image data, and display the image according to the corrected pixel data units. Each of the corrected pixel data units is corrected by reflecting pixel values of first pixel data units of the image data adjacent from a corresponding pixel data unit in the first direction when displayed as the image.

Each of the corrected pixel data units may be corrected by further reflecting pixel values of second pixel data units of the image data adjacent from the corresponding pixel data unit in the second direction when displayed as the image.

The lens array may include lenses, and each of the lenses may extend in a third direction forming an acute angle with the second direction. The number of the first pixel data units may be different from the number of the second pixel data units.

The number of the first pixel data units may be greater than the number of the second pixel data units.

The corrected pixel data units may include a second pixel data unit, and a third pixel data unit positioned between the second pixel data unit and the object, when displayed as the image. The second pixel data unit may be corrected by reflecting pixel values of m pixel data units of the object, and the third pixel data unit may be corrected by reflecting pixel values of n pixel data units of the object, m and n each being a positive integer. m is less than n.

The corrected pixel data units may include a second pixel data unit, and a third pixel data unit positioned between the second pixel data unit and the object, when displayed as the image. The second pixel data unit may be corrected by reflecting a pixel value of a pixel data unit with a first weight, and the third pixel data unit may be corrected by reflecting the pixel value of the pixel data unit of the object with a second weight. The first weight is less than the second weight.

According to another embodiment of the disclosure, an image display system includes a display device including a plurality of pixels arranged in a first direction and a second direction crossing the first direction, and a lens array disposed on an upper surface of the display device, wherein the lens array is configured to refract an image from the display device. The display device is configured to receive image data including an object, correct at least a portion of pixel data units around the object, and display the image according to the corrected pixel data units. The corrected pixel data units include a first pixel data unit, and a second pixel data unit positioned between the first pixel data unit and the object, when displayed as the image. The first pixel data unit is corrected by reflecting pixel values of m pixel data units of the object, and the second pixel data unit is corrected by reflecting pixel values of n pixel data units of the object, m and n each being a positive integer. m is less than n.

The lens array may include lenses, and each of the lenses may extend in a third direction forming an acute angle with the second direction. The corrected pixel data units may include third pixel data units arranged in the first direction, and fourth pixel data units arranged in the second direction, when displayed as the image, and the number of the third pixel data units may be greater than the number of the fourth pixel data units.

The display device may be configured to correct a pixel value of each of the pixel data units around the object according to a pixel value of a corresponding pixel data unit and pixel values of one or more pixel data units around the corresponding pixel data unit.

The display device may include a storage medium configured to store data indicating a first correction range, the corrected pixel data units may include third pixel data units arranged in the first direction among the pixel data units around the object, and the number of the third pixel data units may correspond to the first correction range.

The storage medium may be configured to further store data indicating a second correction range, the corrected pixel data units may include fourth pixel data units arranged in the second direction among the pixel data units around the object, and the number of the fourth pixel data units may correspond to the second correction range.

The display device may correct only a portion of the pixel data units around the object when displayed as the image.

The corrected pixel data units may be arranged spaced apart from each other at a regular interval when displayed as the image The display device may include an edge detector configured to detect an edge of the object.

Another aspect of the disclosure relates to a method of controlling a display panel including a plurality of pixels arranged in a first direction and a second direction crossing the first direction. The display panel is disposed on a lens array configured to refract an image from the display panel. The method includes receiving image data including an object, correcting at least a portion of pixel data units around the object, and displaying the image according to the corrected pixel data units. The corrected pixel data units include a first pixel data unit, and a second pixel data unit positioned between the first pixel data unit and the object, when displayed as the image. The first pixel data unit is corrected by reflecting pixel values of m pixel data units of the object, and the second pixel data unit is corrected by reflecting pixel values of n pixel data units of the object, m and n each being a positive integer. m is less than n.

The lens array may include lenses, and each of the lenses may extend in a third direction forming an acute angle with the second direction. The corrected pixel data units may include third pixel data units arranged in the first direction, and fourth pixel data units arranged in the second direction, when displayed as the image. The number of the third pixel data units may be greater than the number of the fourth pixel data units.

Correcting may include correcting a pixel value of each of the pixel data units around the object by using a pixel value of a corresponding pixel data unit and pixel values of one or more pixel data units around the corresponding pixel data unit.

In correcting, only a portion of the pixel data units around the object may be corrected when displayed as the image.

According to embodiments of the disclosure, an image display system capable of outputting a three-dimensional image of improved reliability may be provided.

An effect according to embodiments is not limited by the content exemplified above, and more various effects are included in the present specification.

BRIEF DESCRIPTION OF THE DRAWINGS

The above and other features of the disclosure will become more apparent by describing in further detail embodiments thereof with reference to the accompanying drawings, in which:

FIG. 6 is a plan view illustrating a pixel array of a display device displaying an object;

DETAILED DESCRIPTION

Figure 1:
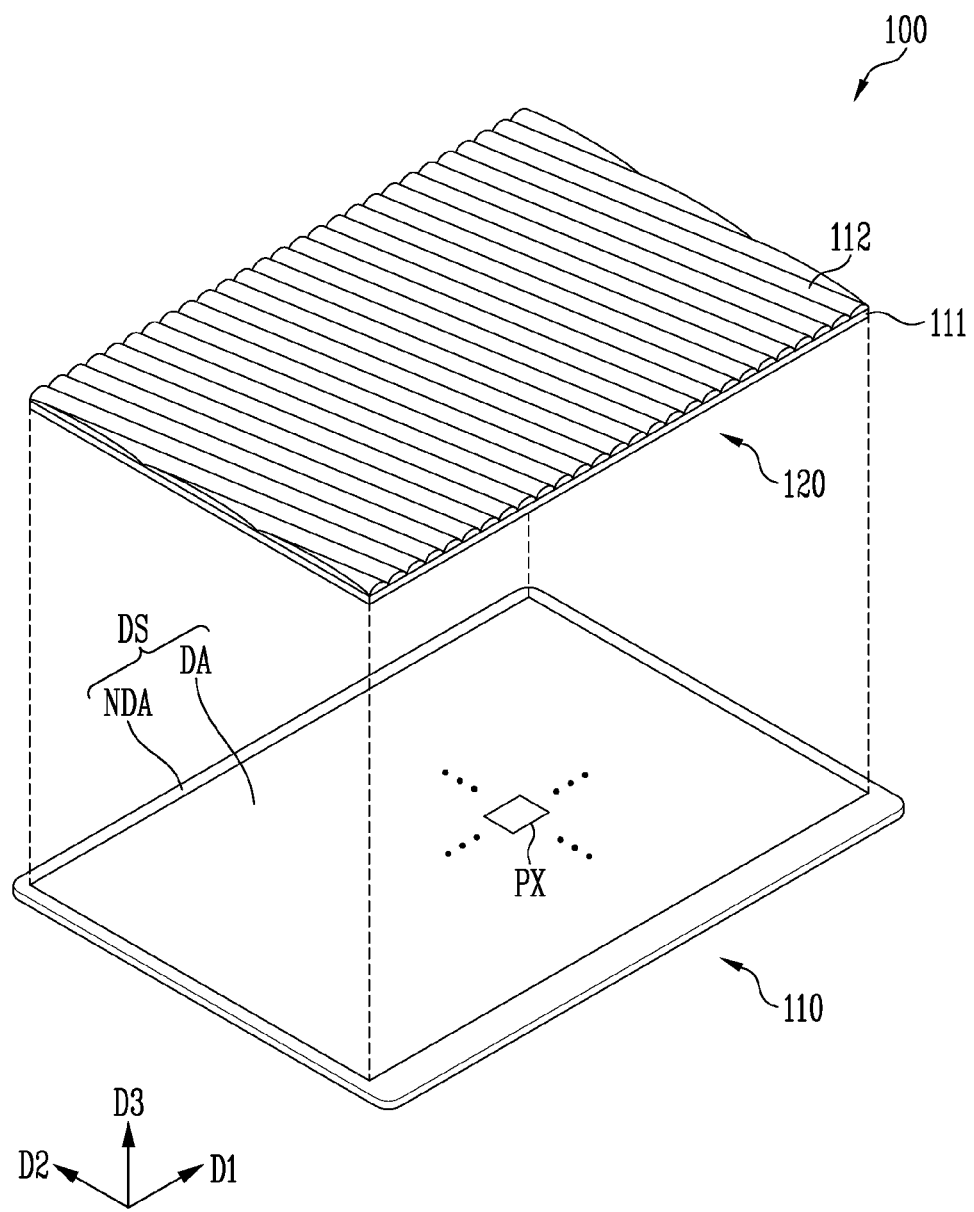
FIG. 1 is an exploded perspective view illustrating an image display system according to an embodiment of the disclosure.

Hereinafter, various embodiments according to the disclosure are described in detail with reference to the accompanying drawings. It should be noted that in the following description, parts useful for understanding an operation according to the disclosure are described, and descriptions of other parts may be omitted in order not to obscure the subject matter of the disclosure. In addition, the disclosure may be embodied in other forms without being limited to the embodiment described herein. However, the embodiment described herein is provided to describe in detail enough to implement the technical spirit of the disclosure to those skilled in the art to which the disclosure belongs.

Throughout the specification, in a case where a portion is "connected" to another portion, the case includes not only a case where the portion is "directly connected" but also a case where the portion is "indirectly connected" with another element interposed therebetween. Terms used herein are for describing specific embodiments and are not intended to limit the disclosure. Throughout the specification, in a case where a certain portion "includes", the case means that the portion may further include another component without excluding another component unless otherwise stated. "At least any one of X, Y, and Z" and "at least any one selected from a group consisting of X, Y, and Z" may be interpreted as one X, one Y, one Z, or any combination of two or more of X, Y, and Z (for example, XYZ, XYY, YZ, and ZZ). Here, "and/or" includes all combinations of one or more of corresponding configurations.

Here, terms such as first and second may be used to describe various components, but these components are not limited to these terms. These terms are used to distinguish one component from another component. Therefore, a first component may refer to a second component within a range without departing from the scope disclosed herein.

Spatially relative terms such as "under", "on", and the like may be used for descriptive purposes, thereby describing a relationship between one element or feature and another element(s) or feature(s) as shown in the drawings. Spatially relative terms are intended to include other directions in use, in operation, and/or in manufacturing, in addition to the direction depicted in the drawings. For example, when a device shown in the drawing is turned upside down, elements depicted as being positioned "under" other elements or features are positioned in a direction "on" the other elements or features. Therefore, in an embodiment, the term "under" may include both directions of on and under. In addition, the device may face in other directions (for example, rotated 90 degrees or in other directions) and thus the spatially relative terms used herein are interpreted according thereto.

Various embodiments are described with reference to drawings schematically illustrating particular embodiments. Accordingly, the shapes may vary, for example, according to tolerances and/or manufacturing techniques. Therefore, the embodiments disclosed herein cannot be construed as being limited to shown specific shapes, and should be interpreted as including, for example, changes in shapes that occur as a result of manufacturing. As described above, the shapes shown in the drawings may not show actual shapes of areas of a device, and the present embodiments are not limited thereto.

Figure 2:
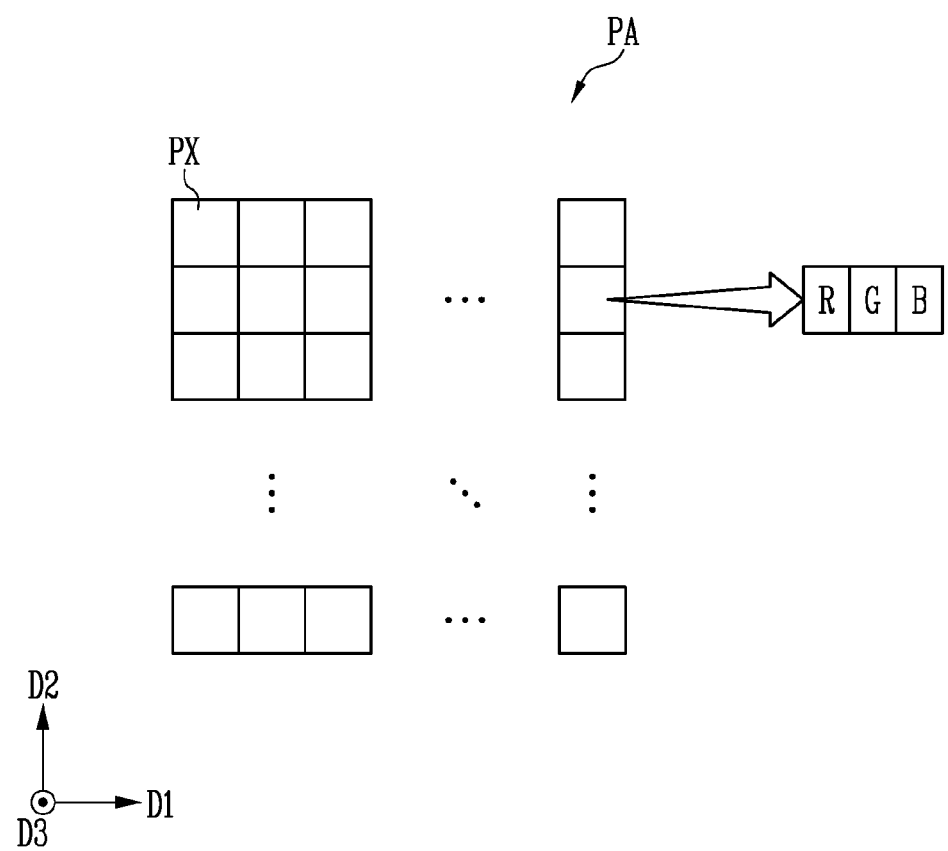
FIG. 2 is a plan view illustrating an embodiment of a pixel array included in the display device of FIG. 1.

FIG. 1 is an exploded perspective view illustrating an image display system according to an embodiment of the disclosure. FIG. 2 is a plan view illustrating an embodiment of a pixel array included in the display device of FIG. 1.

Referring to FIG. 1, the image display system 100 may separately display a left eye image and a right eye image on a front surface of the image display system 100 such that a user may recognize a three-dimensional effect by binocular parallax. Furthermore, the image display system 100 may separate and provide images for a plurality of viewing angles to the front surface of the image display system 100 formed by lenses 112, so that different images are displayed at each of different viewing angles.

The image display system 100 may include a display device 110 and a lens device 120. The image display system 100 may be a light field display system that outputs images through the lens device 120 disposed on an upper surface of the display device 110, so as to allow both eyes of a viewer to see different images. The light field display system may create a stereoscopic image by generating a light field using the display device 110 and the lens device 120. Light rays generated from each pixel of the display device 110 may form a light field directed to a specific viewing angle (or viewpoint) by the lenses 112 of the lens device 120, and thus the viewer may perceive a stereoscopic image corresponding to the specific viewing angle.

The display device 110 may have a display surface DS extending in a first direction D1 and a second direction D2 crossing the first direction D1. The display surface DS may include a display area DA, which is an area where an image is output from the display device 110, and a non-display area NDA around the display area DA. The display area DA can include a plurality of pixels PX that generate an output image. The non-display area NDA can be without pixels.

The display device 110 may include a pixel array configured of a plurality of pixels PX, where each pixel can be configured to emit light of one color, and the pixel array may be arranged in the display area DA.

Referring to FIG. 2, the pixel array PA may include a plurality of pixels PX arranged in the first and second directions D1 and D2. The pixels PX arranged along the first direction D1 among the plurality of pixels PX may form a pixel row, and the pixels PX arranged along the second direction D2 among the plurality of pixels PX may form a pixel column. Each of the plurality of pixels PX may include a plurality of sub-pixels. For example, each of the plurality of pixels PX may include a first sub-pixel R configured to emit red color light, a second sub-pixel G configured to emit green color light, and a third sub-pixel B configured to emit blue color light.

Each of the plurality of pixels PX may include a light emitting element and a pixel circuit configured to drive the light emitting element. In embodiments, the pixel circuit may include thin film transistors and a capacitor. In various embodiments, the pixels PX shown in FIGS. 1 and 2 indicate an emission area where light from the light emitting element is output.

In embodiments, each of the plurality of pixels PX may be connected to at least one scan line and a data line. Each of the plurality of pixels PX may receive a data voltage of the data line when a scan signal is applied from the scan line, and may emit light by supplying a driving current to the light emitting element according to the applied data voltage.

Referring to FIG. 1 again, the lens device 120 may include a flat portion 111 and the lens array disposed on the flat portion 111. The lens array may include a plurality of lenses 112 arranged in the first direction D1, and each of the lenses 112 may have a predetermined width to overlap a predetermined number of pixels PX. Each of the lenses 112 may also have a predetermined curvature. Accordingly, light rays generated from each of the pixels PX may be output at a specific viewing angle by a corresponding lens among the lenses 112. As described above, the lenses 112 may refract light transferred from the display device 110. In embodiments, the lenses 112 may include optically anisotropic material or an optically isotropic material.

The lenses 112 may extend in a slanted direction by a specific acute angle with respect to the second direction D2, where the pixels can be parallel with second direction D2. As such, as the lenses 112 are slanted in the second direction D2, moiré may be prevented from being visually recognized in the image output from the image display system 100. For example, moiré, which may be formed along the second direction D2, may be prevented.

In embodiments, the display device 110 may be a light emitting display device. For example, the display device 110 may include an organic light emitting display device, a quantum dot display device, a micro light emitting diode (LED) display device, and the like.

Figure 3:
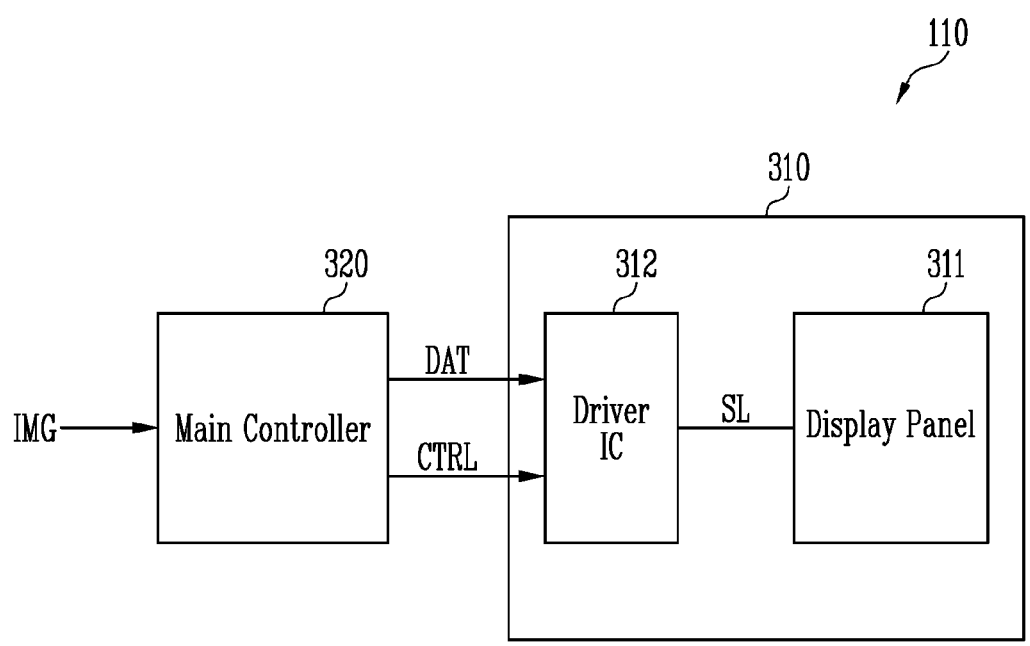
FIG. 3 is a block diagram illustrating an embodiment of the display device of FIG. 1.

FIG. 3 is a block diagram illustrating an embodiment of the display device of FIG. 1.

Referring to FIG. 3, the display device 110 may include a display module 310 and a main controller 320.

The display module 310 may receive a data signal DAT and a control signal CTRL from the main controller 320. The display module 310 may display an image in response to the data signal DAT and the control signal CTRL.

The display module 310 may include a display panel 311 and a driver integrated circuit 312 (driver IC). The display panel 311 can be connected to the driver integrated circuit 312 through a plurality of signal lines SL, that can convey a processed data signal DAT. The display panel 311 may include the plurality of pixels PX described with reference to FIGS. 1 and 2, and the plurality of pixels PX operate in response to control of the driver integrated circuit 312. The display panel 311 may include the display surface DS of FIG. 1.

The driver integrated circuit 312 may be connected to the display panel 311. The driver integrated circuit 312 receives the data signal DAT and the control signal CTRL from the main controller 320. The driver integrated circuit 312 processes the data signal DAT in response to the control signal CTRL, and displays an image on the display panel 311 according to the processed data signal DAT, where the processed data signal DAT can be communicated to the display panel 311 over the signal lines SL. The plurality of signal lines SL may include data lines. The driver integrated circuit 312 may apply grayscale voltages corresponding to the data signal DAT to a plurality of data lines. The display panel 311 may display an image according to the grayscale voltages applied through the data lines.

The main controller 320 can be configured to control the display module 310. The main controller 320 may transmit the data signal DAT and the control signal CTRL to the display module 310, so that the display module 310 displays an image.

The main controller 320 can be configured to receive image data IMG from an external source (e.g., external device) outside of the display device 110, and generate the data signal DAT based on the received image data IMG. The image data IMG can include a plurality of pixel data units. According to an embodiment of the disclosure, the main controller 320 is configured to modify (or correct) at least a portion of pixel data units included in the image data IMG and generate the data signal according to the corrected image data IMG.

Figure 4:
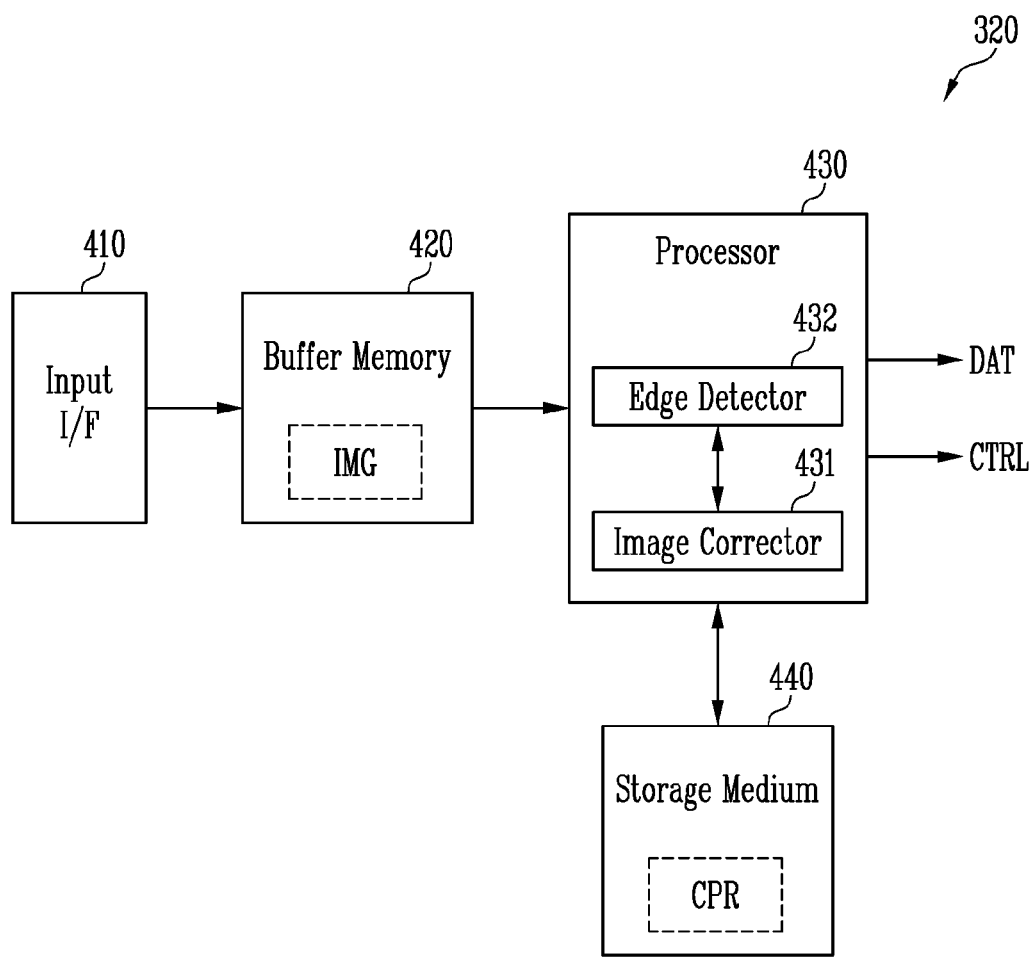
FIG. 4 is a block diagram illustrating an embodiment of a main controller of FIG. 3.

FIG. 4 is a block diagram illustrating an embodiment of the main controller of FIG. 3.

Referring to FIG. 4, the main controller 320 may include an input interface (input I/F) 410, a buffer memory 420, a processor 430, and a storage medium 440.

The input interface 410 can be configured to receive the image data IMG from an external source (e.g., device) and store the received image data IMG in the buffer memory 420.

The buffer memory 420 can be configured to temporarily store the image data IMG, where the buffer memory 420 can be configured to have a storage capacity sufficient to store image data IMG for a processor 430 operating at a predetermined speed (e.g., clock rate). The buffer memory 420 may include at least one of various memories such as a dynamic random access memory (DRAM) and a static random access memory (SRAM).

The processor 430 can be configured to read the image data IMG from the buffer memory 420, process the read image data IMG, and output the data signal DAT according to the processed image data IMG. In addition, the processor 430 may further output the control signal CTRL corresponding to the data signal DAT. The data signal DAT and the control signal CTRL may be transmitted to the display module 310, as described with reference to FIG. 3.

The storage medium 440 operates in response to control of the processor 430. The storage medium 440 may store data in response to the control of the processor 430 and read the stored data. The storage medium 440 may include at least one of various types of storage media capable of maintaining stored data even though power is cut off (i.e., non-volatile memory), such as a register or a flash memory.

According to an embodiment of the disclosure, the processor 430 may include an image corrector 431 configured to correct at least a portion of the pixel data units of the image data IMG. Here, the pixel data units may respectively correspond to the pixels PX included in the pixel array PA described with reference to FIG. 2. In other words, each of the pixel data units of the corrected image data IMG may be expressed by the pixels PX.

The image data IMG may include at least one object such as a person, an animal, a thing, a background, or a figure. When the object of the image data IMG is displayed by the image display system 100 (refer to FIG. 1), the object may be distorted due to the lenses 112 slanted in the specific direction (refer to FIG. 1). In particular, since an edge (or a border) of the object corresponds to a boundary with another adjacent object, distortion near the edge of the object may be visually recognized relatively well by the viewer.

According to an embodiment of the disclosure, the image corrector 431 may correct at least a portion of the pixel data units positioned around the object (or adjacent to the edge of the object) of the image data IMG, and output the data signal DAT according to the corrected pixel data units. Accordingly, the display module 310 of FIG. 3 may receive the correct the image data IMG including a corrected portion of the pixel data units, and display an image according to the corrected pixel data units. As such, the main controller 320 may correct the image data IMG to compensate for distortion of an output image due to the lenses 112 slanted in the predetermined direction.

In embodiments, the processor 430 may further include an edge detector 432. The edge detector 432 can be configured to detect the object included in the image data IMG or the edge of the object. The edge detector 432 may provide information on the object or the edge of the object to the image corrector 431, and the image corrector 431 may determine the object in the image data IMG or the edge of the object, and identify the pixel data units around the object based on the provided information. The pixel data units of a horizontal or vertical correction range can be identified relative to the detected edge of the object.

In embodiments, the edge detector 432 may include at least one of various algorithms known in the art, and may detect the object included in the image data IMG or the edge of the object using the corresponding algorithm. In embodiments, the edge detector 432 may include an artificial intelligence (AI) machine pre-learned to detect the object or the edge of the object. For example, the AI machine may be pre-learned to determine the object included in the image or the edge of the object when an image is input. In this case, the edge detector 432 may input the image data IMG to the AI machine and obtain data for the object output from the AI machine.

The storage medium 440 may store a correction range CPR. When displayed as an image, the image corrector 431 may correct the pixel data units positioned within the correction range CPR from the object (or the edge of the object). In embodiments, the correction range CPR may indicate the number of pixel data units. For example, the correction range CPR may indicate W pixel data units, and the image corrector 431 may correct the W pixel data units positioned sequentially in a specific direction from the object with reference to the correction range CPR. In embodiments, the correction range CPR may indicate the number of pixel data units in the first direction D1 (refer to FIG. 1) and/or the number of pixel data units in the second direction D2 (refer to FIG. 1).

In embodiments, the storage medium 440 may store a default value as the correction range CPR in advance. In embodiments, the main controller 320 may receive a user setting value determined by a user input through the input interface 410, and store the received user setting value in the storage medium 440. In this case, the correction range CPR may be determined according to the default value and the user setting value.

Figure 5:
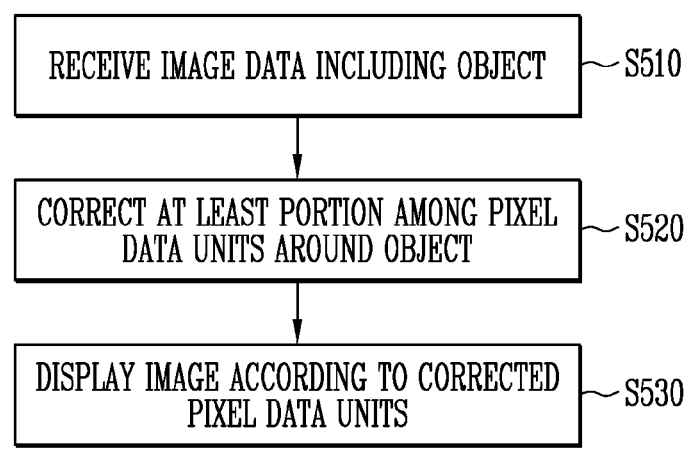
FIG. 5 is a flowchart illustrating a method of operating the main controller of FIG. 3.

FIG. 5 is a flowchart illustrating a method of operating the main controller of FIG. 3.

Referring to FIGS. 3 and 5, in S510, the image data IMG including the object is received. For example, the main controller 320 may receive the image data IMG from an external source (e.g., device), such as a graphic processing unit.

The image data IMG may include at least one object. When the object of the image data IMG is displayed by the image display system 100 (refer to FIG. 1), the object may be distorted due to the lenses 112 slanted in the specific direction (refer to FIG. 1). In particular, distortion near the edge of the object may be visually recognized relatively well by the viewer.

In S520, the main controller 320 may correct at least a portion of the pixel data units around the object included in the image data IMG. The main controller 320 may compensate for the distortion of the output image due to the lenses 112 slanted in the specific direction by correcting at least a portion of the pixel data units positioned around the object of the image data IMG.

In S530, the main controller 320 may display an image on the display module 310 according to the corrected pixel data units.

Hereinafter, correction performed on the pixel data units is described in more detail with reference to FIGS. 6 to 15.

FIG. 6 is a plan view illustrating the pixel array of the display device displaying the object.

Referring to FIGS. 3 and 6, the pixel array PA of the display device 110 may include the plurality of pixels PX arranged along the first direction D1 and the second direction D2. In FIG. 6, some of the pixels PX of the pixel array PA are shown for convenience of description.

The image data IMG may include an object OBJ. When the object OBJ is displayed as an image on the pixel array PA, the object OBJ may be displayed by some of the plurality of pixels PX. As shown in FIG. 6, the object OBJ may have a quadrangular shape.

Figure 7:
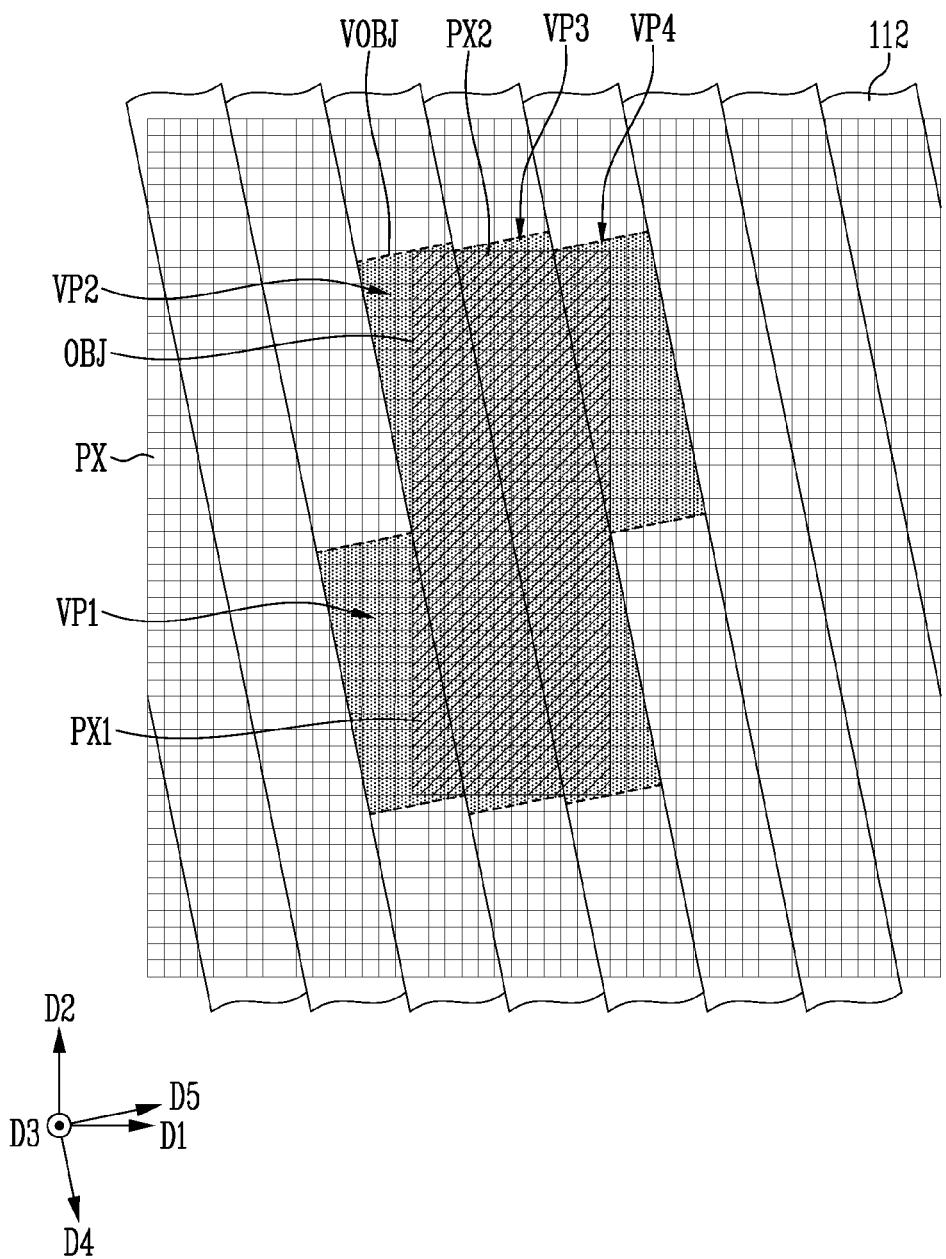
FIG. 7 is a plan view illustrating an object visualized by refraction of the object of FIG. 6 by lenses.

FIG. 7 is a plan view illustrating an object visualized by refraction of the object of FIG. 6 by the lenses.

Referring to FIG. 7, a plurality of lenses 112 may overlap the pixel array PA of FIG. 6. Each of the lenses 112 may extend in a fourth direction D4 which is a direction slanted by a predetermined angle with respect to the second direction D2, where the angle between the fourth direction D4 and the second direction D2 can be an obtuse angle. Accordingly, moiré may be prevented from being formed along the second direction D2 in an image passing through the lenses 112.

Each of the lenses 112 may overlap a predetermined number of pixels PX in the first direction D1, where partial pixels PX may be overlapped along opposite edges of the lenses 112. In FIG. 7, for convenience of description, each of the lenses 112 is shown as overlapping six pixels PX including partial pixels PX in the first direction D1.

The object OBJ of FIG. 6 may be refracted by the lenses 112 and visualized. A visualized object VOBJ may have a distorted shape near the edge of the object OBJ displayed on the pixel array PA due to the slanted lenses 112. For example, light output in the third direction D3 from each of the pixels PX may be refracted by a corresponding lens and may be transmitted in a direction between the third direction D3 and a fifth direction D5 and/or in a direction between an opposite direction of the fifth direction D5 and the third direction D3.

For example, light emitted in the third direction D3 from the first pixel PX1 expressing the edge of the object OBJ may be refracted by a corresponding lens, and may be transmitted in a specific direction between the opposite direction of the fifth direction D5 and the third direction D3. As such, the visualized object VOBJ may include first and second portions VP1 and VP2 protruding from the edge of the object OBJ, by the lens overlapping the edge of the object OBJ. Due to the first and second portions VP1 and VP2, the visualized object VOBJ may be viewed as having a distorted left edge. Similarly, the visualized object VOBJ may be viewed as having a distorted right edge including fourth portion VP4. The extent of the distortions can be related to the width of the lenses 112.

For example, light output in the third direction D3 from the second pixel PX2 expressing the edge of the object OBJ may be refracted by a corresponding lens and may be transmitted in the direction between the third direction D3 and the fifth direction D5. As such, the visualized object VOBJ may include third and fourth portions VP3 and VP4 by the lens overlapping the edge of the object OBJ. Due to the third and fourth portions VP3 and VP4, the visualized object VOBJ may be viewed as having a distorted upper edge. Similarly, the visualized object VOBJ may be viewed as having a distorted lower edge.

Figure 8:
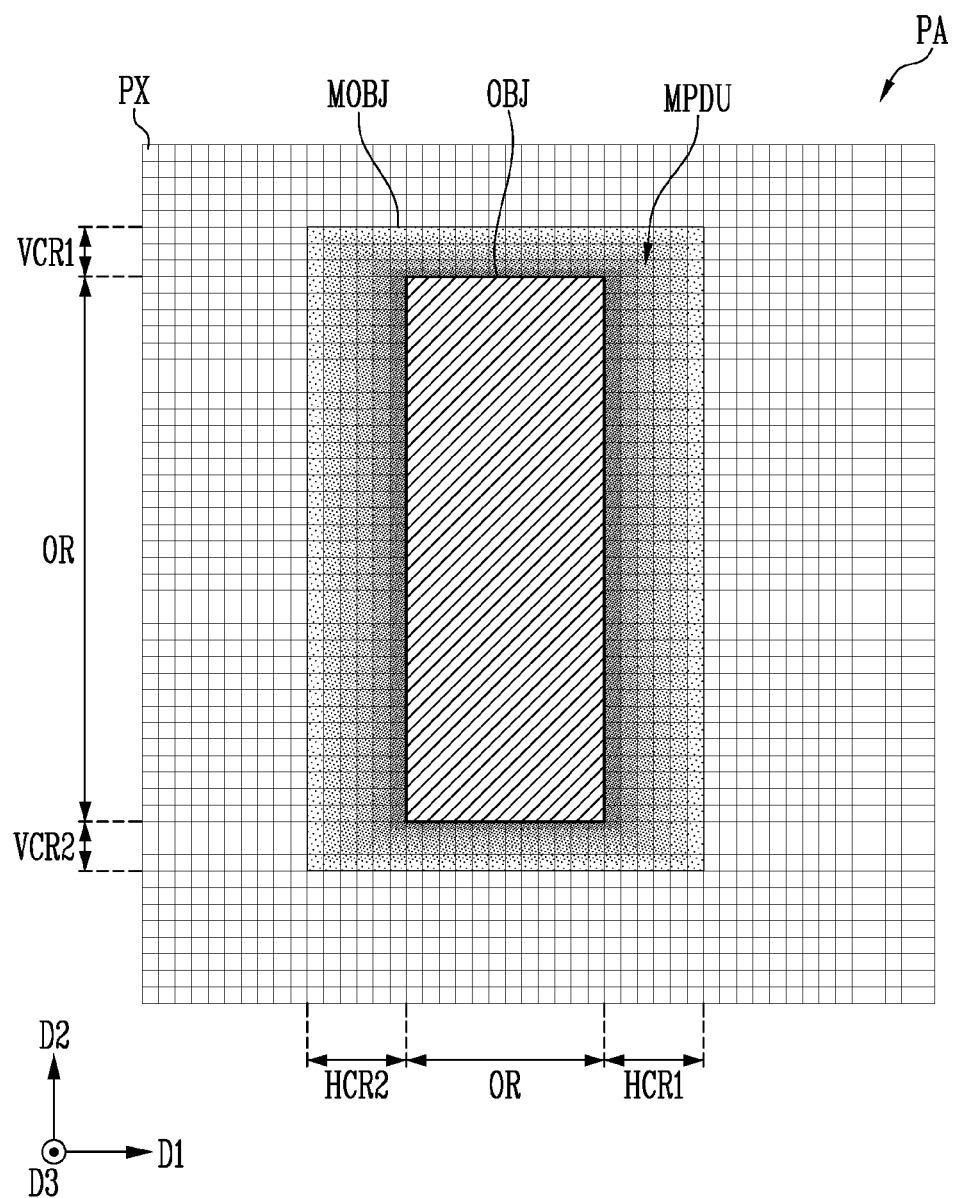
FIG. 8 is a plan view illustrating a pixel array of a display device displaying a corrected object.

FIG. 8 is a plan view illustrating the pixel array of the display device displaying the corrected object.

The main controller 320 may compensate for the distortion of the visualized object due to the lenses 112 (refer to FIG. 7) slanted in the specific direction, by correcting at least a portion of the pixel data units positioned around the object OBJ (refer to FIG. 6).

Referring to FIG. 8, a corrected object MOBJ may be generated by correcting pixel values of pixel data units positioned within a correction range from an edge of an original object OBJ. At this time, the pixel value may mean a level indicated by data bits of the pixel data unit, for example, RGB values. In embodiments, the pixel value may be a grayscale value indicated by the pixel data unit. The corrected image data IMG may include the corrected object MOBJ.

The corrected object MOBJ may include corrected pixel data units MPDU around and extending away from the original object OBJ, and thus a size of the corrected object MOBJ may be larger than a size of the original object OBJ. The corrected pixel data units MPDU can be adjacent to the edges of the object OBJ.

In embodiments, pixel values of pixel data units positioned within a first horizontal correction range HCR1 from an area OR in the first direction D1 where the object OBJ is positioned (hereinafter referred to as object area) may be adjusted. Pixel values of pixel data units positioned within a second horizontal correction range HCR2 from the object area OR in a direction opposite to the first direction D1 may be adjusted.

In embodiments, pixel values of pixel data units positioned within a first vertical correction range VCR1 from the object area OR may be adjusted, in the second direction D2. Pixel values of pixel data units positioned within a second vertical correction range VCR2 from the object area OR may be adjusted, in a direction opposite to the second direction D2.

A length of the first vertical correction range VCR1 and a length of the second vertical correction range VCR2 may be the same. A length of the first horizontal correction range HCR1 and a length of the second horizontal correction range HCR2 may correspond to the same number of pixel data units. The lengths of the first and second horizontal correction ranges HCR1 and HCR2 and the lengths of the first and second vertical correction ranges VCR1 and VCR2 may be determined by the correction range CPR of FIG. 4.

The lenses 112 of FIG. 1 extend in a direction slanted at an acute angle formed with respect to the second direction D2. In addition, due to an extension direction of the lenses 112, as shown in FIG. 7, the visualized object VOBJ may be distorted more at left and right edges than at upper and lower edges. For example, as shown in FIG. 7, the first and second portion VP1 and VP2 of the visualized object VOBJ are larger than the third and fourth portions VP3 and VP4. Accordingly, the lengths of the first and second horizontal correction ranges HCR1 and HCR2 may be greater than the lengths of the first and second vertical correction ranges VCR1 and VCR2.

Figure 9:
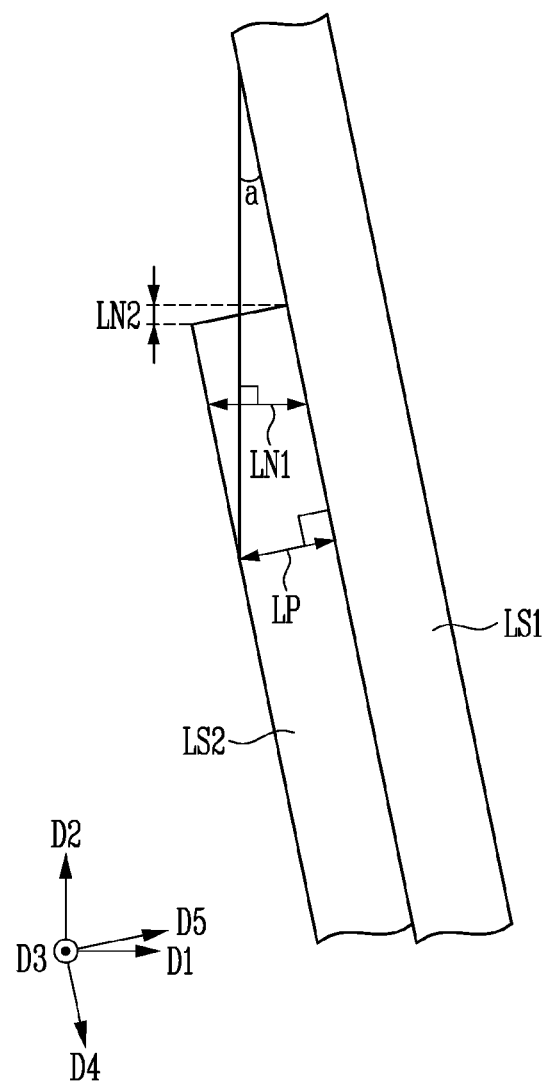
FIG. 9 is a diagram illustrating a horizontal correction range and a vertical correction range.

FIG. 9 is a diagram illustrating a horizontal correction range and a vertical correction range.

Referring to FIG. 9, two lenses LS1 and LS2 among the lenses 112 of FIG. 1 are shown for convenience of description. The first and second lenses LS1 and LS2 extend in the fourth direction D4. The fourth direction D4 is slanted by an angle "a" with respect to the second direction D2. The angle a may be an acute angle.

The pixel array PA of FIG. 8 is arranged along the first direction D1. Considering such a point, the horizontal correction range may be determined as a first length LN1 of the first direction D1 of one lens. For example, a length of the horizontal correction range may be determined according to Equation 1 below.

$$LN1 = \frac{LP}{\cos(a)} \times \frac{1}{PPh} \qquad \text{[Equation 1]}$$

In Equation 1, LN1 represents the length of the horizontal correction range, LP represents a width of one lens, and PPh represents a width of the first direction D1 of one pixel of the pixel array PA. For example, PPh may be a distance between centers of two pixels neighboring in the first direction D1.

In addition, the pixel array PA of FIG. 8 is arranged along the second direction D2. Considering such a point, the vertical correction range may be determined as a second length LN2. The second length LN2 may be defined according to Equation 2 below.

$$LN2 = (LP \times \sin(a)) \times \frac{1}{PPv} \qquad \text{[Equation 2]}$$

In Equation 2, LN2 represents a length of the vertical correction range, LP represents the width of one lens, and PPv represents a width of the second direction D2 of one pixel of the pixel array PA. For example, PPv may be a distance between centers of two pixels neighboring in the second direction D2.

In embodiments, the horizontal correction range and the vertical correction range determined in the method described above may be previously stored in the storage medium 440 as the correction range CPR of FIG. 4.

Figure 10:
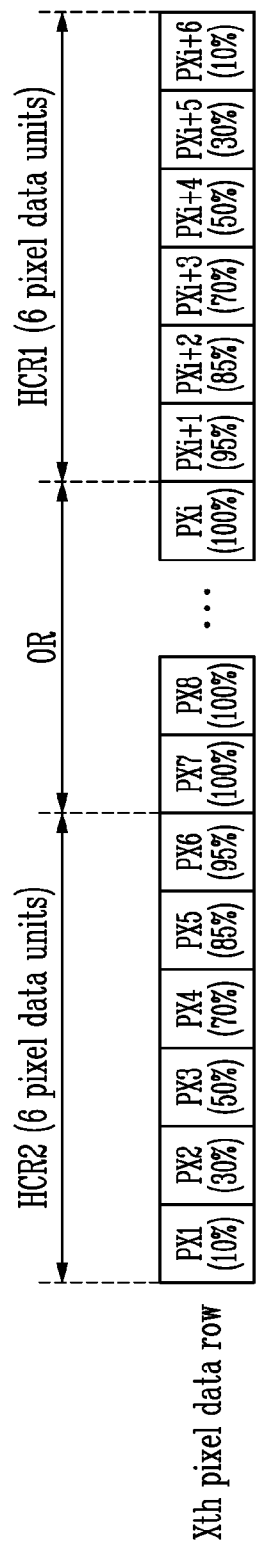
FIG. 10 is a diagram illustrating an example of a change of pixel values of pixel data units in first and second horizontal correction ranges of FIG. 8.

FIG. 10 is a diagram illustrating an example of a change of the pixel values of the pixel data units in the first and second horizontal correction ranges of FIG. 8.

Referring to FIGS. 8 and 10, an X-th pixel data row may include a plurality of pixel data units. First to (i+6)-th data pixel units PX1 to PXi+6 may be included in the pixel data units of the X-th pixel data row (X is a positive integer).

Each of the first and second horizontal correction ranges HCR1 and HCR2 may correspond to, for example, six pixel data units. In this case, when seventh to i-th pixel data units PX7 to PXi are positioned in the object area OR, (i+1)-th to (i+6)-th pixel data units PXi+1 to PXi+6 may belong to the first horizontal correction range HCR1, and the first to sixth pixel data units PX1 to PX6 may belong to the second horizontal correction range HCR2.

The pixel data units PXi+1 to PXi+6 of the first horizontal correction range HCR1 may be corrected to reflect pixel values of at least a portion of the pixel data units of the object area OR. At this time, the pixel data units PXi+1 to PXi+6 of the first horizontal correction range HCR1 may reflect the pixel values of the pixel data units of the object area OR at a rate that gradually decreases as a distance from the object area OR increases.

In embodiments, in the first horizontal correction range HCR1, a pixel data unit farther from the object area OR may reflect pixel values of a smaller number of pixel data units of the object area OR when compared to a pixel data unit closer to the object area OR. For example, a pixel value of an (i+1)-th pixel data unit PXi+1 may be corrected to reflect pixel values of (i−4)-th to i-th pixel data units PXi−4 to PXi of the object area OR, and a pixel value of an (i+2)-th pixel data unit PXi+1 may be corrected to reflect pixel values of (i−3)-th to i-th data units PXi−3 to PXi of the object area OR.

In embodiments, in the first horizontal correction range HCR1, a pixel data unit farther from the object area OR may reflect the pixel value of the pixel data unit of the object area OR with a lower weight when compared to the pixel data unit closer to the object area OR. For example, the pixel value of the (i+1)-th pixel data unit PXi+1 may be corrected to reflect a pixel value of an adjacent i-th pixel data unit PXi in the object area OR with a first weight (e.g., 95%), and a pixel value of an (i+2)-th pixel data unit PXi+2 may be corrected to reflect the pixel value of the i-th pixel data unit PXi with a second weight (e.g., 85%) lower than the first weight.

As such, the pixel data units of the first horizontal correction range HCR1 may reflect the pixel values of the pixel data units of the object area OR at a rate that gradually decreases as the distance from the object area OR increases.

For convenience of description, it is assumed that the pixel data units of the object OBJ have the highest pixel value and the other pixel data units have the lowest pixel value. For example, all of the pixel data units of the object OBJ may correspond to white of the highest grayscale. In FIG. 10, each of seventh to i-th pixel data units PX7 to PXi of the object area OR is illustrated as having a pixel value of 100%. As such, the pixel values of the pixel data units of the first horizontal correction range HCR1 may reflect the pixel values of the pixel data units of the object area OR at the rate that gradually decreases, and thus may gradually decrease as a distance from the edge of object area OR increases. For example, as shown in FIG. 10, the (i+1)-th to (i+6)-th pixel data units PXi+1 to PXi+6 may 95%, 85%, 70%, 50%, 30%, and 10% pixel values, respectively, when compared to the pixel data unit of the object area OR.

Similarly to the first horizontal correction range HCR1, pixel data units PX1 to PX6 of the second horizontal correction range HCR2 may also reflect the pixel values of the pixel data units of the object area OR at a rate that gradually decreases as the distance from the edge of the object area OR increases. In embodiments, in the second horizontal correction range HCR2, the pixel data unit farther from the object area OR may reflect pixels values of a smaller number of pixel data units of the object area OR compared to the pixel data unit closer to the object area OR. In embodiments, in the second horizontal correction range HCR2, the pixel data unit farther from the edge of the object area OR may reflect the pixel value of the pixel data unit of the object area OR with a lower weight compared to the pixel data unit closer to the object area OR. Accordingly, pixel values of the pixel data units PX1 to PX6 of the second horizontal correction range HCR2 may also gradually decrease as the distance from the edge of the object area OR increases. For example, as shown in FIG. 10, sixth to first pixel data units PX6 to PX1 may have pixel values of 95%, 85%, 70%, 50%, 30%, and 10%, respectively, when compared to the pixel data unit of the object area OR. The first pixel data unit PX1 can be corrected by reflecting pixel values of pixel data units of the object OBJ of the number corresponding to a first ratio. The second pixel data unit PX2 can be corrected by reflecting pixel values of pixel data units of the object OBJ of the number corresponding to a second ratio.

In embodiments, the pixel value of each pixel data unit may be associated with pixel values of a predetermined number (for example, six) of pixel data units adjacent in the first direction D1. Here, the predetermined number of pixel data units may be determined according to the horizontal correction range. For example, a pixel value of an M-th pixel data unit may be determined according to Equation 3 below.

$$GS(M) = \sum_{p=0}^{W}(GS(M-p) \times R1p)$$ [Equation 3]

In Equation 3, GS(M) may represent the pixel value of the M-th pixel data unit, W may represent the number of pixel data units corresponding to the horizontal correction range, GS(M-p) may represent a pixel value of a pixel data unit spaced apart from the M-th pixel data unit by p pixel data units in the direction opposite to the first direction (or the first direction), and R1p may represent a weight that is multiplied by GS(M-p) to provide a ratio. At this time, p is an integer greater than or equal to 0, and M may be a positive integer greater than p, such that M-p would not be a negative number. The storage medium 440 of FIG. 4 may further store R1p. For example, the pixel value of the M-th pixel data unit may be corrected as GS*(M)*0.5, GS*(M−1)*0.2, GS*(M−2)*0.1, GS*(M−3)*0.1, GS*(M−4)*0.05, and GS*(M−5)*0.05. As such, a pixel value of each pixel data unit may be corrected according to a pixel value of a corresponding pixel data unit and pixel values of W pixel data units around the corresponding pixel data unit.

In embodiments, without detecting the object OBJ, the pixel value of each pixel data unit may be corrected by reflecting pixel values of a predetermined number of pixel data units (for example, W pixel data units) adjacent to a corresponding pixel data unit in the first direction D1 or in the direction opposite to the first direction D1. For example, pixel values of at least a portion of the pixel data units of the image data IMG may be corrected by processing the image data IMG based on an algorithm corresponding to Equation 3. According to such a correction operation, as a result, the pixel data units of the first and second horizontal correction ranges HCR1 and HCR2 around the object OBJ may have corrected pixel values. In other embodiments, the edge of the object OBJ may be detected by the edge detector 432 of FIG. 4, and the pixel values of the pixel data units of the first and second horizontal correction ranges HCR1 and HCR2 around and adjacent to the object OBJ may be corrected.

Figure 11:
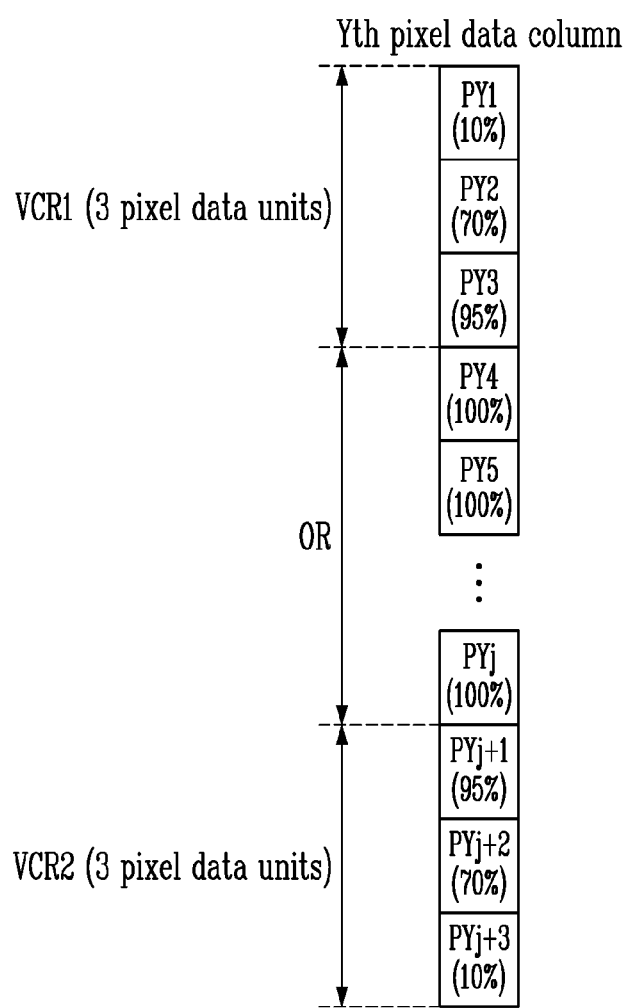
FIG. 11 is a diagram illustrating an example of a change of pixel values of the pixel data units in first and second vertical correction ranges of FIG. 8.

FIG. 11 is a diagram illustrating an example of a change of the pixel values of the pixel data units in the first and second vertical correction ranges of FIG. 8.

Referring to FIGS. 8 and 11, a Y-th pixel data column may include a plurality of pixel data units. First to (j+3)-th pixel data units PY1 to PYj+3 may be included in the plurality of pixel data units of the Y-th pixel data column (Y is a positive integer).

Each of the first and second vertical correction ranges VCR1 and VCR2 may correspond to, for example, three pixel data units. The vertical correction range may be less than the horizontal correction range. When fourth to j-th pixel data units PY4 to PYj are positioned in the object area OR, first to third pixel data units PY1 to PY3 may be positioned in the first vertical correction range VCR1, and (j+1)-th to (j+3)-th pixel data units PYj+1 to PYj+3 may be positioned in the second vertical correction range VCR2.

The pixel data units PY1 to PY3 of the first vertical correction range VCR1 may reflect the pixel values of the pixel data units of the object area OR at a rate that gradually decreases as the distance from the object area OR increases. In embodiments, in the first vertical correction range VCR1, the pixel data unit farther from the edge of the object area OR may reflect pixels values of a smaller number of pixel data units of the object area OR in the second direction D2 compared to the pixel data unit closer to the edge of the object area OR. In embodiments, the pixel data unit farther from the object area OR may reflect the pixel value of the pixel data unit of the object area OR with a lower weight compared to the pixel data unit closer to the object area OR. When the fourth to j-th pixel data units PY4 to PYj of the object area OR have the highest pixel value and the other pixel data units have the lowest pixel value, the pixel values of the pixel data units of the first vertical correction range VCR1 may gradually decrease as the distance from the object area OR increases. For example, as shown in FIG. 11, third to first pixel data units PY3 to PY1 may have pixel values of 95%, 70%, and 10%, respectively, when compared to the pixel data unit of the object area OR.

Similarly to the first vertical correction range VCR1, pixel data units PYj+1 to PYj+3 of the second vertical correction range VCR2 may reflect the pixel values of the pixel data units of the object area OR at a rate that gradually decreases as the distance from the object area OR increases. Accordingly, the pixel values of the pixel data units of the second vertical correction range VCR2 may also gradually decrease as the distance from the object area OR increases. For example, as shown in FIG. 11, the (j+1)-th to (j+3)-th pixel data units PYj+1 to PYj+3 is 95% may have pixel values of 95%, 70%, and 10%, respectively, compared to the pixel data unit of the object area OR.

In embodiments, the pixel value of the pixel data unit may be associated with pixel values of a predetermined number (for example, three) of pixel data units adjacent in the second direction D2. Here, the predetermined number of pixel data units may be determined according to the vertical correction range. For example, a pixel value of an N-th pixel data unit may be determined according to Equation 4 below.

$$GS(N) = \sum_{q=0}^{Z}(GS(N-q) \times R2q)$$ [Equation 4]

In Equation 4, GS(N) may represent the pixel value of the N-th pixel data unit, Z may represent the number of pixel data units corresponding to the vertical correction range, GS(N-q) may represent a pixel value of a pixel data unit spaced apart from the N-th pixel data unit by q pixel data units in the second direction (or the direction opposite to the second direction), and R2q may represent a weight that is multiplied by GS(N-q) to provide a ratio. At this time, q may be an integer greater than or equal to 0, and Z may be a positive integer greater than q. Z may be less than W in Equation 3. The storage medium 440 of FIG. 4 may further store R2q. For example, the pixel value of the N-th pixel data unit may be corrected as a sum of GS*(N)*0.5, GS*(N−1)*0.3, and GS*(N−2)*0.2. As such, the pixel value of each pixel data unit of the vertical correction range may be corrected according to a pixel value of a corresponding pixel data unit and pixel values of Z pixel data units around the corresponding pixel data unit.

In embodiments, without detecting the object OBJ, the pixel value of each pixel data unit may be corrected by reflecting pixel values of pixel data units adjacent to a corresponding pixel data unit in the first direction D1 or in the direction opposite to the first direction D1 and additionally reflecting pixel values of a predetermined number of pixel data units (for example, Z pixel data units) adjacent to the corresponding pixel data unit in the second direction D2 or in the direction opposite to the second direction D2. For example, pixel values of at least a portion of the pixel data units of the image data IMG may be corrected by processing the image data IMG based on an algorithm corresponding to Equation 4 together with the algorithm corresponding to Equation 3. According to a correction operation according to Equation 4, as a result, the pixel data units of the first and second vertical correction ranges VCR1 and VCR2 around the object OBJ may have corrected pixel values. In other embodiments, the edge of the object OBJ may be detected by the edge detector 432 of FIG. 4, and the pixel values of the pixel data units of the first and second vertical correction ranges VCR1 and VCR2 around the object OBJ may be corrected.

Figure 12:
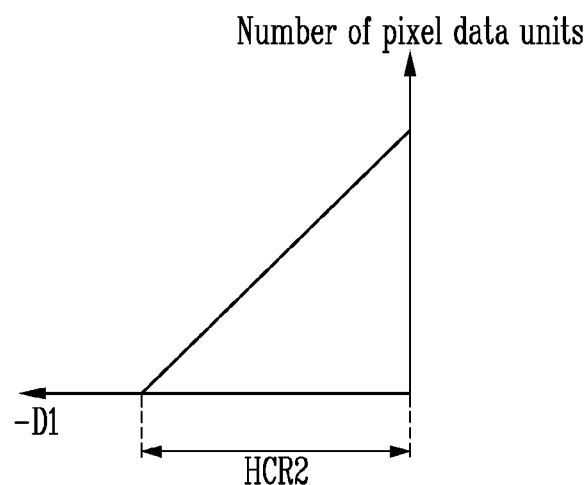
FIG. 12 is a graph illustrating the number of pixel data units of the object, which is reflected in the pixel data unit of the second horizontal correction range of FIG. 8.
Figure 13:
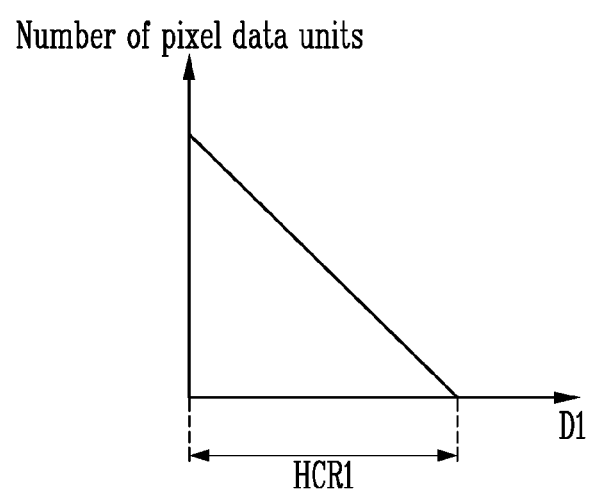
FIG. 13 is a graph illustrating the number of pixel data units of the object, which is reflected in the pixel data unit of the first horizontal correction range of FIG. 8.
Figure 14:
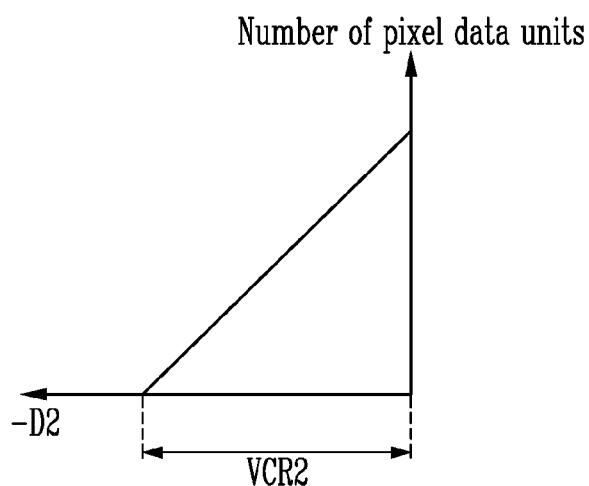
FIG. 14 is a graph illustrating the number of pixel data units of the object, which is reflected in the pixel data unit of the second vertical correction range of FIG. 8.
Figure 15:
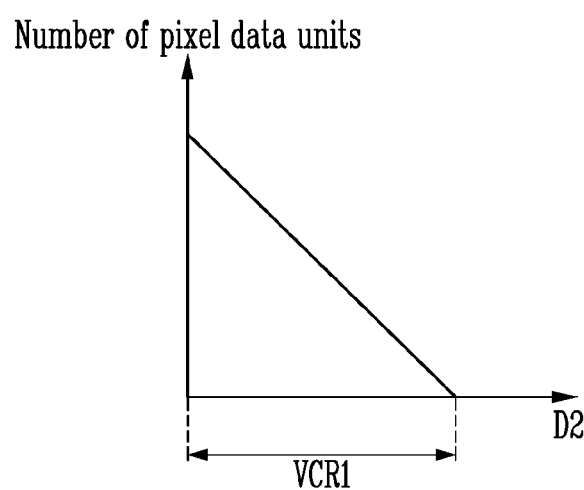
FIG. 15 is a graph illustrating the number of pixel data units of the object, which is reflected in the pixel data unit of the first vertical correction range of FIG. 8.

FIG. 12 is a graph illustrating the number of pixel data units of the object, which is reflected in the pixel data unit of the second horizontal correction range of FIG. 8. FIG. 13 is a graph illustrating the number of pixel data units of the object, which is reflected in the pixel data unit of the first horizontal correction range of FIG. 8. FIG. 14 is a graph illustrating the number of pixel data units of the object, which is reflected in the pixel data unit of the second vertical correction range of FIG. 8. FIG. 15 is a graph illustrating the number of pixel data units of the object, which is reflected in the pixel data unit of the first vertical correction range of FIG. 8.

In FIG. 12, a horizontal axis represents the pixel data units arranged in the direction opposite to the first direction D1 (shown as −D1), and a vertical axis represents the number of pixel data units of the object reflected in each pixel data unit. Referring to FIG. 12, in the second horizontal correction range HCR2, each pixel data unit may reflect a smaller number of pixel data units of objects OBJ as a distance between the corresponding pixel data unit and the object OBJ increases. The relationship between the number of pixel data units of the object reflected in each pixel data unit and the distance between the corresponding pixel data unit and the object OBJ can be a linear relationship.

In FIG. 13, a horizontal axis represents the pixel data units arranged in the first direction D1, and a vertical axis represents the number of pixel data units of the object reflected in each pixel data unit. Referring to FIG. 13, in the first horizontal correction range HCR1, each pixel data unit may reflect a smaller number of pixel data units of objects OBJ as a distance between the pixel data unit and the object OBJ increases. The relationship between the number of pixel data units of the object reflected in each pixel data unit and the distance between the corresponding pixel data unit and the object OBJ can be a linear relationship.

In FIG. 14, a horizontal axis represents the pixel data units arranged in the direction opposite to the second direction D2 (shown as −D2), and a vertical axis represents the number of pixel data units of the object reflected in each pixel data unit. Referring to FIG. 14, in the second vertical correction range VCR2, each pixel data unit may reflect a smaller number of pixel data units of objects OBJ as a distance between the corresponding pixel data unit and the object OBJ increases.

In FIG. 15, a horizontal axis represents the pixel data units arranged in the second direction D2, and a vertical axis represents the number of pixel data units of the object reflected in each pixel data unit. Referring to FIG. 15, in the first vertical correction range VCR1, each pixel data unit reflects a smaller number of pixel data units of the object OBJ, as a distance between the corresponding pixel data unit and the object OBJ increases.

Figure 16:
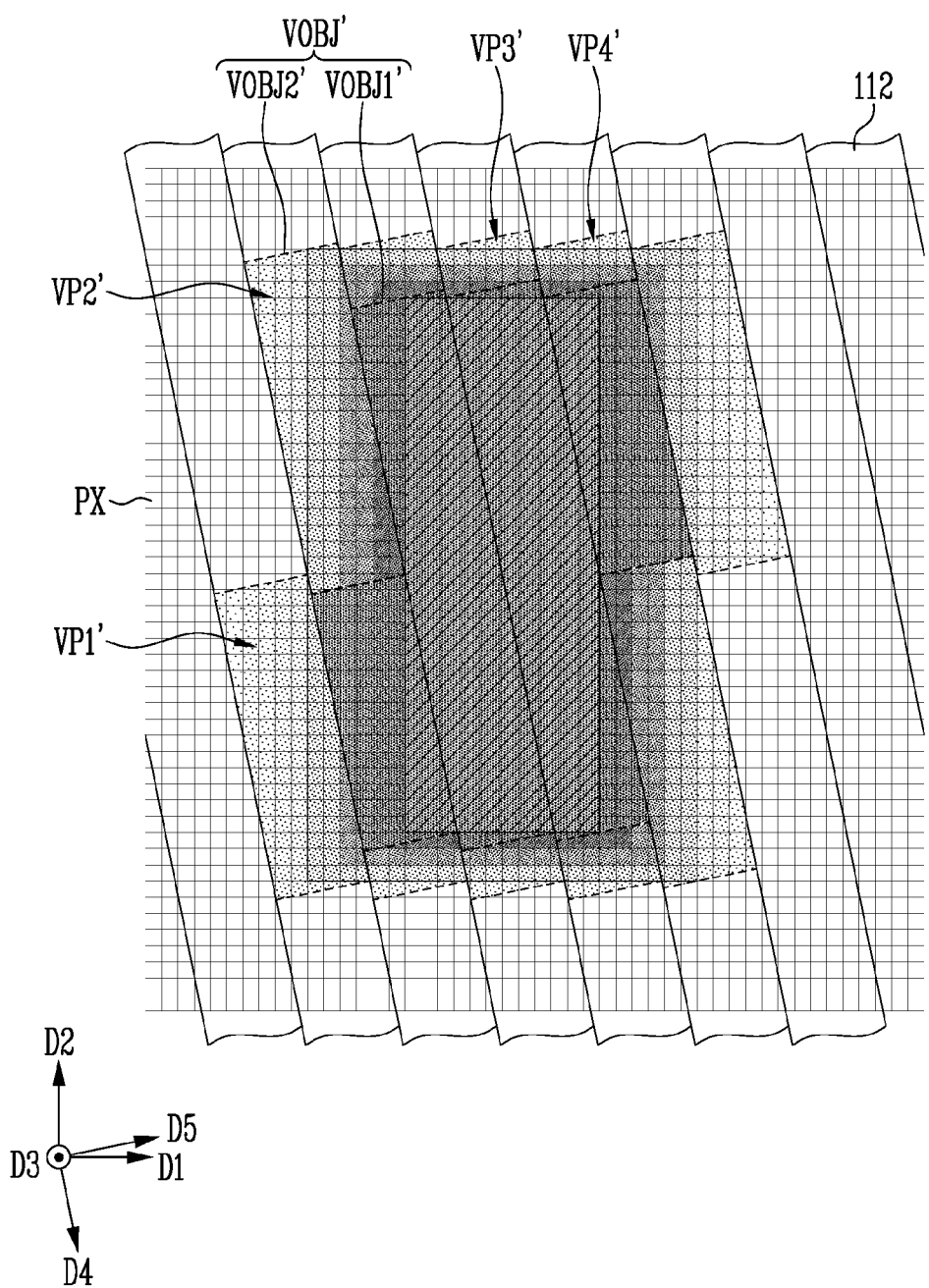
FIG. 16 is a plan view illustrating an object visualized by refraction of the corrected object of FIG. 8 by the lenses.

FIG. 16 is a plan view illustrating the object visualized by refraction of the corrected object of FIG. 8 by lenses.

Referring to FIG. 16, a visualized object VOBJ' may include a first visualized object portion VOBJ1' and a second visualized object portion VOBJ2'. The first visualized object portion VOBJ1' may be substantially the same as the visualized object VOBJ of FIG. 7. The second visualized object portion VOBJ2' may be provided according to light generated from the pixel data units belonging to the first and second horizontal correction ranges HCR1 and HCR2 and the first and second vertical correction ranges VCR1 and VCR2 of FIG. 8.

By a lens overlapping an edge of the corrected object MOBJ of FIG. 8, the second visualized object portion VOBJ2' may include first and second portions VP1' and VP2' protruding from a left edge of the corrected object MOBJ. In addition, by a lens overlapping an upper edge of the corrected object MOBJ, the second visualized object portion VOBJ2' may include third and fourth portions VP3' and VP4' protruding from the corresponding edge of the corrected object MOBJ.

As described with reference to FIGS. 8 to 15, the pixel values the of corrected pixel data units reflect the pixel values of the object area OR at a rate that gradually decreases as the distance from the object area OR increases. When the pixel data units of the object OBJ have the highest pixel value and the other pixel data units have the lowest pixel value, as shown in FIG. 16, brightness of the second visualized object portion VOBJ2' may gradually decrease as the distance from the first visualized object portion VOBJ1' increases. As such, the second visualized object portion VOBJ2' may compensate for a distorted shape near the edge of the visualized object VOBJ (or VOBJ1') of FIG. 6. For example, the visualized object VOBJ' may be viewed as having edges that are relatively straight when compared to the visualized object VOBJ of FIG. 6.

Figure 17:
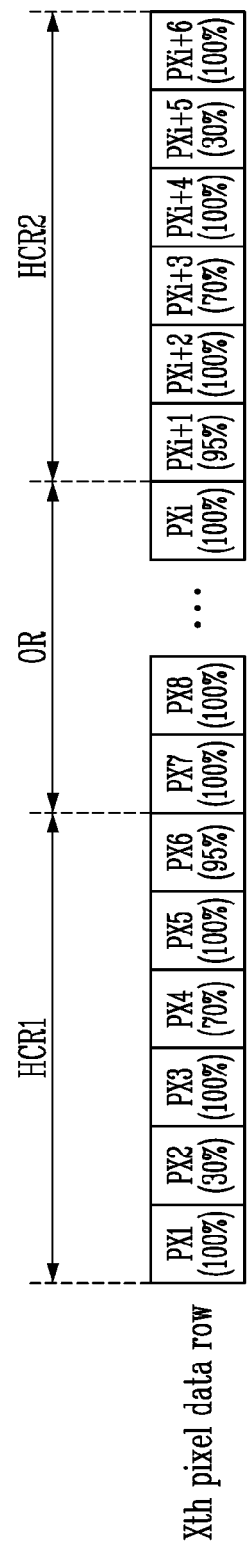
FIG. 17 is a diagram illustrating another example of a change of the pixel values of the pixel data units in the first and second horizontal correction ranges of FIG. 8.
Figure 18:
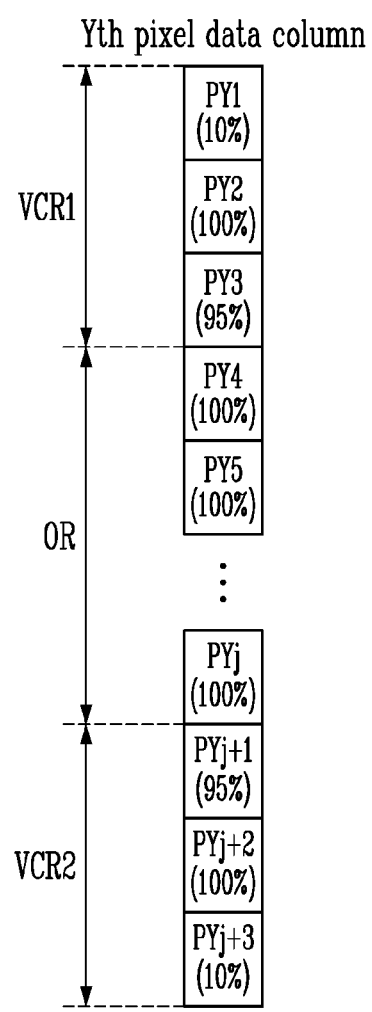
FIG. 18 is a diagram illustrating another example of a change of the pixel values of the pixel data units in the first and second vertical correction ranges of FIG. 8.

FIG. 17 is a diagram illustrating another example of a change of the pixel values of the pixel data units in the first and second horizontal correction ranges of FIG. 8. FIG. 18 is a diagram illustrating another example of a change of the pixel values of the pixel data units in the first and second vertical correction ranges of FIG. 8.

According to embodiments of the disclosure, only a portion of the pixel data units around the object OBJ may be corrected. Discontinuous correction may be performed in the first and second horizontal correction ranges HCR1 and HCR2. For example, a first pixel data unit, a third pixel data unit, and a fifth pixel data unit may be corrected from the object area OR. As such, the corrected pixel data units may be arranged spaced apart from each other at a regular interval when displayed as an image. At this time, the corrected pixel data units may reflect the pixel values of the object area OR at a rate that gradually decreases as the distance from the object area OR increases. When the pixel data units of the object OBJ have the highest pixel value and the other pixel data units have the lowest pixel value, as illustrated in FIG. 17, the sixth to first pixel data units PX6 to PX1 may have pixel values of 95%, 100%, 70%, 100%, 30%, and 100%, respectively, when compared to the pixel data unit of the object area OR. The (i+1)-th to (i+6)-th pixel data units PXi+1 to PXi+6 may have pixel values of 95%, 100%, 70%, 100%, and 30%, respectively, when compared to the pixel data units of the object area OR.

Referring to FIG. 18, discontinuous correction may be performed in the first and second vertical correction ranges VCR1 and VCR2. For example, the first pixel data unit and the third pixel data unit may be corrected from the object area OR. At this time, the corrected pixel data units may reflect the pixel values of the object area OR at a rate that gradually decreases as the distance from the object area OR increases. When the pixel data units of the object OBJ have the highest pixel value and the other pixel data units have the lowest pixel value, as illustrated in FIG. 18, the third to first pixel data units PY3 to PY1 may have pixel values of 95%, 100%, and 10%, respectively, when compared to the pixel data unit of the object area OR. The (j+1)-th to (j+3)-th pixel data units PYj+1 to PYj+3 may have pixel values of 95%, 100%, and 10%, respectively, when compared to the pixel data units of the object area OR.

Although specific embodiments and application examples are described herein, other embodiments and modifications may derive from the above description. Therefore, the spirit of the disclosure is not limited to these embodiments, and extends to the claims set forth below, various obvious modifications, and equivalents.

What is claimed is:

1. An image display system comprising:
a display device including a plurality of pixels arranged in a first direction and a second direction crossing the first direction; and
a lens array disposed on an upper surface of the display device, wherein the lens array is configured to refract an image from the display device, wherein the display device is configured to receive image data including an object, correct at least a portion of pixel data units of the image data,
display the image according to the corrected pixel data units, and each of the corrected pixel data units is corrected by reflecting pixel values of first pixel data units of the image data adjacent to a corresponding pixel data unit in the first direction when displayed as the image,
wherein: the corrected pixel data units include a second pixel data unit, and a third pixel data unit positioned between the second pixel data unit and the object, when displayed as the image; the second pixel data unit is corrected by reflecting pixel values of m pixel data units of the object, and the third pixel data unit is corrected by reflecting pixel values of n pixel data units of the object, m and n each being a positive integer; and m is less than n.

2. The image display system according to claim 1, each of the corrected pixel data units are corrected by further reflecting pixel values of second pixel data units of the image data adjacent from the corresponding pixel data unit in the second direction when displayed as the image.

3. The image display system according to claim 2, wherein the lens array includes a plurality of lenses, where each of the plurality of lenses extends in a third direction forming an acute angle with the second direction, and
a number of the first pixel data units is different from a number of the second pixel data units.

4. The image display system according to claim 3, wherein the number of the first pixel data units is greater than the number of the second pixel data units.

5. The image display system according to claim 1, wherein:
the corrected pixel data units include a second pixel data unit, and a third pixel data unit positioned between the second pixel data unit and the object, when displayed as the image;
the second pixel data unit is corrected by reflecting a pixel value of a pixel data unit with a first weight, and the third pixel data unit is corrected by reflecting the pixel value of the pixel data unit of the object with a second weight; and
the first weight is less than the second weight.

6. An image display system comprising:
a display device including a plurality of pixels arranged in a first direction and a second direction crossing the first direction; and
a lens array disposed on an upper surface of the display device, wherein the lens array is configured to refract an image from the display device,
wherein the display device is configured to receive image data including an object, correct at least a portion of pixel data units around the object, and display the image according to the corrected pixel data units,
the corrected pixel data units include a first pixel data unit, and a second pixel data unit positioned between the first pixel data unit and the object, when displayed as the image,
the first pixel data unit is corrected by reflecting pixel values of m pixel data units of the object, the second pixel data unit is corrected by reflecting pixel values of n pixel data units of the object, m and n each being a positive integer, and
m is less than n.

7. The image display system according to claim 6, wherein the lens array includes lenses, each of the lenses extends in a third direction forming an acute angle with the second direction,
the corrected pixel data units include third pixel data units arranged in the first direction, and fourth pixel data units arranged in the second direction, when displayed as the image, and the number of the third pixel data units is greater than the number of the fourth pixel data units.

8. The image display system according to claim 6, wherein the display device is configured to correct a pixel value of each of the pixel data units around the object according to a pixel value of a corresponding pixel data unit and pixel values of one or more pixel data units around the corresponding pixel data unit.

9. The image display system according to claim 6, wherein the display device includes a storage medium configured to store data indicating a first correction range,
the corrected pixel data units include third pixel data units arranged in the first direction among the pixel data units around the object, and
the number of the third pixel data units corresponds to the first correction range.

10. The image display system according to claim 9, wherein the storage medium is configured to further store data indicating a second correction range,
the corrected pixel data units include fourth pixel data units arranged in the second direction among the pixel data units around the object, and
the number of the fourth pixel data units corresponds to the second correction range.

11. The image display system according to claim 6, wherein the display device corrects only a portion of the pixel data units around the object when displayed as the image.

12. The image display system according to claim 11, wherein the corrected pixel data units are arranged spaced apart from each other at a regular interval when displayed as the image.

13. The image display system according to claim 6, wherein the display device includes an edge detector configured to detect an edge of the object.

14. A method of controlling a display panel including a plurality of pixels arranged in a first direction and a second direction crossing the first direction, the display panel disposed on a lens array configured to refract an image from the display panel, the method comprises:

receiving image data including an object;

correcting at least a portion of pixel data units around the object; and displaying the image according to the corrected pixel data units, wherein the corrected pixel data units include a first pixel data unit, and a second pixel data unit positioned between the first pixel data unit and the object, when displayed as the image, the first pixel data unit is corrected by reflecting pixel values of m pixel data units of the object, the second pixel data unit is corrected by reflecting pixel values of n pixel data units of the object, m and n each being a positive integer, and m is less than n.

15. The method according to claim 14, wherein the lens array includes lenses, each of the lenses extends in a third direction forming an acute angle with the second direction,
the corrected pixel data units include third pixel data units arranged in the first direction, and fourth pixel data units arranged in the second direction, when displayed as the image, and
the number of the third pixel data units is greater than the number of the fourth pixel data units.

16. The method according to claim 14, wherein correcting comprises correcting a pixel value of each of the pixel data units around the object by using a pixel value of a corresponding pixel data unit and pixel values of one or more pixel data units around the corresponding pixel data unit.

17. The method according to claim 14, wherein in correcting, only a portion of the pixel data units around the object is corrected when displayed as the image.

* * * * *